US012767455B2

(12) United States Patent
Kleinikkink et al.

(10) Patent No.: US 12,767,455 B2
(45) Date of Patent: Oct. 20, 2026

(54) SYSTEMS AND METHODS FOR FEEDING WORKPIECES TO A MANUFACTURING LINE

(71) Applicant: ATS Corporation, Cambridge (CA)

(72) Inventors: Stanley Kleinikkink, Cambridge (CA); Steven Wardell, Cambridge (CA); Michael Tze-Chun Chow, Cambridge (CA)

(73) Assignee: ATS Corporation, Cambridge (CA)

( * ) Notice: Subject to any disclaimer, the term of this patent is extended or adjusted under 35 U.S.C. 154(b) by 423 days.

(21) Appl. No.: 18/512,957

(22) Filed: Nov. 17, 2023

(65) Prior Publication Data

US 2024/0082975 A1 Mar. 14, 2024

Related U.S. Application Data

(63) Continuation of application No. PCT/CA2023/050431, filed on Mar. 30, 2023.

(Continued)

(51) Int. Cl.

*B65G 47/14* (2006.01)
*B23Q 15/22* (2006.01)

(Continued)

(52) U.S. Cl.

CPC ....... *B65G 47/1407* (2013.01); *B23Q 15/225* (2013.01); *B65G 43/08* (2013.01);

(Continued)

(58) Field of Classification Search

CPC ................ B65G 47/1407; B65G 47/14; B65G 47/1421; B65G 47/1428; B65G 47/1464;

(Continued)

(56) References Cited

U.S. PATENT DOCUMENTS

| | | | | |
|---|---|---|---|---|
| 5,553,737 A * | 9/1996 | Kelly | H01R 43/055 | 221/277 |
| 5,687,831 A * | 11/1997 | Carlisle | H05K 13/022 | 198/395 |

(Continued)

FOREIGN PATENT DOCUMENTS

| | | |
|---|---|---|
| JP | 2017036104 A | 2/2017 |
| WO | 2020026447 A1 | 2/2020 |

OTHER PUBLICATIONS

International Search Report & Written Opinion of the ISA/CA issued Jun. 8, 2023 in PCT/CA2023/050431.

(Continued)

*Primary Examiner* — Thomas Randazzo
(74) *Attorney, Agent, or Firm* — Valauskas Corder LLC

(57) ABSTRACT

Computer-implemented methods and systems for feeding workpieces to a manufacturing line are provided. An example method involves operating at least one processor to: receive, from at least one image device proximal to a bowl feeder, a sequence of images of workpieces within the bowl feeder; determine a flow velocity of the workpieces within the bowl feeder; generate bowl feeder control settings by applying the flow velocity to a predictive model; and automatically apply the bowl feeder control settings to the bowl feeder. Computer-implemented methods and systems for predicting anomalies in a manufacturing line are also provided. An example method involves operating at least one processor to: receive a sequence of images of workpieces in the manufacturing line; extract feature data from the sequence of images; apply the feature data to a predictive model to detect anomalies in the manufacturing line; and generate annotations to locate the anomalies within the images.

26 Claims, 3 Drawing Sheets

Related U.S. Application Data

(60) Provisional application No. 63/325,785, filed on Mar. 31, 2022, provisional application No. 63/325,795, filed on Mar. 31, 2022.

(51) Int. Cl.

| | |
|---|---|
| ***B65G 43/08*** | (2006.01) |
| ***G05B 19/418*** | (2006.01) |
| ***G06T 7/00*** | (2017.01) |
| ***G06V 10/25*** | (2022.01) |
| ***G06V 10/40*** | (2022.01) |

(52) U.S. Cl.
CPC ......... *B65G 47/14* (2013.01); *B65G 47/1421* (2013.01); *B65G 47/1428* (2013.01); *B65G 47/1464* (2013.01); *G05B 19/4184* (2013.01); *G05B 19/4189* (2013.01); *G06T 7/0004* (2013.01); *G06V 10/25* (2022.01); *G06V 10/40* (2022.01); *B65G 2203/025* (2013.01); *G06T 2207/30164* (2013.01)

(58) Field of Classification Search
CPC ............ B65G 43/08; B65G 2203/0208; B65G 2203/025; B65G 2203/041; B23Q 15/225; G05B 19/4184; G05B 19/4189; G05B 2219/32194; G05B 19/41875; G06T 7/0004; G06T 2207/30164; G06V 10/25; G06V 10/40
See application file for complete search history.

(56) References Cited

U.S. PATENT DOCUMENTS

| | | | | |
|---|---|---|---|---|
| 5,853,078 | A * | 12/1998 | Kneubuhler | B65G 47/1421 198/395 |
| 10,029,859 | B2 * | 7/2018 | Papsdorf | B65G 47/1435 |
| 2018/0334336 | A1 | 11/2018 | Oowatari | |
| 2019/0119053 | A1 * | 4/2019 | Deng | B65G 65/44 |
| 2019/0286119 | A1 | 9/2019 | Rothfuss | |
| 2020/0166921 | A1 | 5/2020 | Lavid Ben Lulu et al. | |
| 2020/0388042 | A1 | 12/2020 | Langle et al. | |

OTHER PUBLICATIONS

Supplementary Partial European Search Report issued Feb. 11, 2026 in 23777544.0.

* cited by examiner

SYSTEMS AND METHODS FOR FEEDING WORKPIECES TO A MANUFACTURING LINE

CROSS-REFERENCE TO RELATED PATENT APPLICATIONS

This application is a continuation of International Application No. PCT/CA2023/050431 filed on Mar. 30, 2023, which claims the benefit of U.S. Provisional Patent Application No. 63/325,795, filed on Mar. 31, 2022, entitled "SYSTEMS AND METHODS FOR PREDICTING ANOMALIES IN A MANUFACTURING LINE" and U.S. Provisional Patent Application No. 63/325,785, filed on Mar. 31, 2022, entitled "SYSTEMS AND METHODS FOR CONTROLLING A BOWL FEEDER". The entire contents of each of International Application No. PCT/CA2023/050431, U.S. Provisional Patent Application No. 63/325,795 and U.S. Provisional Patent Application No. 63/325,785 are incorporated herein by reference for all purposes.

FIELD

The described embodiments generally relate to system and methods for feeding workpieces to a manufacturing line, and system and methods for detecting anomalies in a manufacturing line.

BACKGROUND

The following is not an admission that anything discussed below is part of the prior art or part of the common general knowledge of a person skilled in the art.

Manufacturing processes can involve processing (e.g., assembling, fabricating, treating, refining, etc.) raw materials or parts to produce products. Inline feeders, or linear feeders are often used to transport or carry parts or workpieces between production stations for processing. Generally similar workpieces are transported along the inline feeders synchronously. Workpieces that are not similar may have missing parts and ultimately fail to produce an acceptable product, thus resulting in overall production losses. Workpieces that are transported asynchronously can inhibit or delay the subsequent production station, also resulting in overall production losses.

Bowl feeders are often used to feed individual parts or workpieces to manufacturing lines. For example, bowl feeders can receive a randomly sorted bulk package of parts and feed the parts to a manufacturing line one-by-one. Furthermore, bowl feeders can also adjust the parts to have a particular orientation. For example, bowl feeders can rely on the mechanical behaviour of a part, such that when gently shaken down a chute that is shaped for the part, the part will gradually be shaken so that it has a particular alignment or orientation on the manufacturing line. However, shaking of the bowl feeder can result in jams and faults. The bowl feeder may need to be stopped in order to clear the jam or fault. Downtime to the bowl feeder or the conveyor can also result in overall production losses.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

The various embodiments described herein generally relate to methods (and associated systems configured to implement the methods) for feeding workpieces to a manufacturing line via a bowl feeder.

An example method involves operating at least one processor to: receive, from at least one image device proximal to the bowl feeder, a sequence of images of workpieces within the bowl feeder; determine, from the sequence of images, a flow velocity of the workpieces within the bowl feeder; generate bowl feeder control settings by applying the flow velocity of the workpieces to a predictive model; and automatically apply the bowl feeder control settings to the bowl feeder.

In at least one embodiment, the method can further involve operating the at least one processor to determine bowl feeder parameter settings. Operating the at least one processor to generate bowl feeder control settings can further involve applying the bowl feeder parameter settings to the predictive model.

In at least one embodiment, the bowl feeder parameter settings can include a bowl fill level and an operating mode.

In at least one embodiment, the operating mode can include at least one of a group consisting of a burst mode, a hold mode, and an automatic mode.

In at least one embodiment, the method can further involve operating the at least one processor to receive, from at least one sensor disposed at the bowl feeder, current condition data indicating at least one current condition of the bowl feeder. Operating the at least one processor to generate bowl feeder control settings can further involve applying the current condition data to the predictive model.

In at least one embodiment, the at least one sensor can include a humidity sensor to generate humidity data indicative of a humidity level at the bowl feeder.

In at least one embodiment, the at least one sensor can include a temperature sensor to generate temperature data indicative of a temperature at the bowl feeder.

In at least one embodiment, the at least one sensor can include a vibration sensor to generate vibration data indicative of a vibration of the bowl feeder.

In at least one embodiment, the at least one sensor can include a part feed sensor to generate part feed data indicative of a count of workpieces output by the bowl feeder.

In at least one embodiment, the method can further involve operating the at least one processor to generate a replenishment notification based on the count of workpieces output by the bowl feeder.

In at least one embodiment, the at least one sensor can include a part position sensor to generate part position data indicative of part positions within the bowl feeder.

In at least one embodiment, the method can further involve operating the at least one processor to generate a fault notification based on the part positions detected within the bowl feeder.

In at least one embodiment, the at least one sensor can include another image device to generate image data of workpieces within the bowl feeder; and the method can involve operating the at least one processor to determine dimensions of the workpieces within the bowl feeder based on the image data.

In at least one embodiment, the method can further involve operating the at least one processor to determine at least one performance metric for the bowl feeder.

Operating the at least one processor to generate bowl feeder control settings can further involve applying the at least one performance metric to the predictive model.

In at least one embodiment, the at least one performance metric can include at least one of a current operation rate or a current operation performance.

In at least one embodiment, the bowl feeder control settings can include at least one of a motor control setting, a blow-off control setting, or a hopper control setting.

In at least one embodiment, the at least one processor can be located remotely from the bowl feeder.

In another broad aspect, a system for feeding workpieces to a manufacturing line via a bowl feeder is disclosed herein. The system includes at least one processor operable to: receive, from at least one image device proximal to the bowl feeder, a sequence of images of workpieces within the bowl feeder; determine, from the sequence of images, a flow velocity of the workpieces within the bowl feeder; generate bowl feeder control settings by applying the flow velocity of the workpieces to a predictive model; and automatically apply the bowl feeder control settings to the bowl feeder.

In at least one embodiment, the at least one processor can be further operable to determine bowl feeder parameter settings; and apply the bowl feeder parameter settings to the predictive model.

In at least one embodiment, the bowl feeder parameter settings can include a bowl fill level and an operating mode.

In at least one embodiment, the operating mode can be at least one selected from a group consisting of a burst mode, a hold mode, and an automatic mode.

In at least one embodiment, the at least one processor can be further operable to receive, from at least one sensor disposed at the bowl feeder, current condition data indicating at least one current condition of the bowl feeder; and apply the current condition data to the predictive model.

In at least one embodiment, the at least one sensor can include a humidity sensor to generate humidity data indicative of a humidity level at the bowl feeder.

In at least one embodiment, the at least one sensor can include a temperature sensor to generate temperature data indicative of a temperature at the bowl feeder.

In at least one embodiment, the at least one sensor can include a vibration sensor to generate vibration data indicative of a vibration of the bowl feeder.

In at least one embodiment, the at least one sensor can include a part feed sensor to generate part feed data indicative of a count of workpieces output by the bowl feeder.

In at least one embodiment, the at least one processor can be further operable to generate a replenishment notification based on the count of workpieces output by the bowl feeder.

In at least one embodiment, the at least one sensor can include a part position sensor to generate part position data indicative of part positions within the bowl feeder.

In at least one embodiment, the at least one processor can be further operable to generate a fault notification based on the part positions detected within the bowl feeder.

In at least one embodiment, the at least one sensor can include another image device to generate image data of workpieces within the bowl feeder; and the at least one processor can be operable to determine dimensions of the workpieces within the bowl feeder based on the image data.

In at least one embodiment, the at least one processor can be further operable to determine at least one performance metric for the bowl feeder and apply the at least one performance metric to the predictive model.

In at least one embodiment, the at least one performance metric can include at least one of a current operation rate or a current operation performance.

In at least one embodiment, the bowl feeder control settings can include at least one of a motor control setting, a blow-off control setting, or a hopper control setting.

In at least one embodiment, the at least one processor can be located remotely from the bowl feeder.

In another broad aspect, a method for predicting anomalies in a manufacturing line is disclosed herein. The method involves operating at least one processor to: receive a sequence of images of one or more workpieces in the manufacturing line; extract, from the sequence of images, feature data representing a motion and an appearance of the one or more workpieces in the manufacturing line; apply the feature data to a predictive model to detect one or more anomalies in the manufacturing line; generate one or more annotations to locate the one or more anomalies within the images of the manufacturing line; and generate at least one notification to identify the anomalies, the at least one notification comprising the one or more annotations.

In at least one embodiment, the method can involve operating the at least one processor to: for each anomaly of the one or more anomalies, identify at least one image amongst the sequence of images showing the anomaly; select feature data associated with the anomaly; and apply the feature data associated with the anomaly to the predictive model to determine a classification to be associated with the anomaly.

In at least one embodiment, the at least one notification can include an indication of the classification associated with the anomaly.

In at least one embodiment, the method can further involve operating the at least one processor to: determine one or more corrective actions for the one or more anomalies based on the classifications associated with the one or more anomalies; define a set of operating commands for one or more actuators of the manufacturing line based on the one or more corrective actions; and operate the one or more actuators to implement the one or more corrective actions.

In at least one embodiment, the at least one notification can include an indication of the one or more corrective actions.

In at least one embodiment, the manufacturing line can include a transport mechanism.

In at least one embodiment, the method can involve operating the at least one processor to classify the anomaly as at least one of a missing part of a workpiece or a change in a synchronous speed of a workpiece along the transport mechanism.

In at least one embodiment, the manufacturing line can include a bowl feeder.

In at least one embodiment, the method can involve operating the at least one processor to classify the anomaly as at least one of an accumulation of workpieces within the bowl feeder, a misalignment of workpieces within the bowl feeder, or insufficient workpieces within a lower portion of the bowl feeder.

In at least one embodiment, the method can further involve operating the at least one processor to pre-process the sequence of images.

In at least one embodiment, operating the at least one processor to pre-process the sequence of images can involve operating the at least one processor to align each image of the sequence of images.

In at least one embodiment, operating the at least one processor to pre-process the sequence of images can involve operating the at least one processor to: detect one or more moving workpieces in the sequence of images; segment each moving workpiece of the one or more moving workpieces in a first image of the sequence of images; select at least one moving workpiece of the one or more moving workpieces; and identify a region of interest for each selected moving workpiece in each image of the sequence of images.

In at least one embodiment, the method can involve operating the at least one processor to: identify a plurality of images amongst the sequence of images showing a same moving workpiece of the one or more moving workpieces; select feature data associated with the moving workpiece comprising a position and a timing associated with the position of the moving workpiece in each image of the plurality of images; and apply the feature data associated with the moving workpiece to a regression model to determine the velocity of the moving workpiece.

In at least one embodiment, the method can involve operating the at least one processor to reconstruct the motion of the moving workpiece across the plurality of images.

In at least one embodiment, the method can involve operating the at least one processor to detect and mask the moving workpiece within each image of the plurality of images.

In another broad aspect, a system for predicting anomalies in a manufacturing line is disclosed herein. The system includes at least one processor operable to: receive a sequence of images of one or more workpieces in the manufacturing line; extract, from the sequence of images, feature data representing a motion and an appearance of the one or more workpieces in the manufacturing line; apply the feature data to a predictive model to detect one or more anomalies in the manufacturing line; generate one or more annotations to locate the one or more anomalies within the images of the manufacturing line; and generate at least one notification to identify the anomalies, the at least one notification comprising the one or more annotations.

In at least one embodiment, the at least one processor can be operable to: for each anomaly of the one or more anomalies, identify at least one image amongst the sequence of images showing the anomaly; select feature data associated with the anomaly; and apply the feature data associated with the anomaly to the predictive model to determine a classification to be associated with the anomaly.

In at least one embodiment, the at least one notification can include an indication of the classification associated with the anomaly.

In at least one embodiment, the at least one processor can be operable to: determine one or more corrective actions for the one or more anomalies based on the classifications associated with the one or more anomalies; define a set of operating commands for one or more actuators of the manufacturing line, based on the one or more corrective actions; and operate the one or more actuators to implement the one or more corrective actions.

In at least one embodiment, the at least one notification can include an indication of the one or more corrective actions.

In at least one embodiment, the manufacturing line can include a transport mechanism.

In at least one embodiment, the at least one processor can be operable to classify the anomaly as at least one of a missing part of a workpiece or a change in a synchronous speed of a workpiece along the transport mechanism.

In at least one embodiment, the manufacturing line can include a bowl feeder.

In at least one embodiment, the at least one processor is operable to classify the anomaly as at least one of an accumulation of workpieces within the bowl feeder, a misalignment of workpieces within the bowl feeder, or insufficient workpieces within a lower portion of the bowl feeder.

In at least one embodiment, the at least one processor can be further operable to pre-process the sequence of images.

In at least one embodiment, the at least one processor can be operable to pre-process the sequence of images can include the at least one processor being operable to align each image of the sequence of images.

In at least one embodiment, the at least one processor can be operable to pre-process the sequence of images can include the at least one processor being operable to: detect one or more moving workpieces in the sequence of images; segment each moving workpiece of the one or more moving workpieces in a first image of the sequence of images; select at least one moving workpiece of the one or more moving workpieces; and identify a region of interest for each selected moving workpiece in each image of the sequence of images.

In at least one embodiment, the at least one processor can be operable to: identify a plurality of images amongst the sequence of images showing a same moving workpiece of the one or more moving workpieces; select feature data associated with the moving workpiece comprising a position and a timing associated with the position of the moving workpiece in each image of the plurality of images; and apply the feature data associated with the moving workpiece to a regression model to determine the velocity of the moving workpiece.

In at least one embodiment, the at least one processor can be operable to reconstruct the motion of the moving workpiece across the plurality of images.

In at least one embodiment, the at least one processor can be operable to detect and mask the moving workpiece within each image of the plurality of images.

An example non-transitory computer-readable medium including instructions executable on a processor can implementing any one of the methods disclosed herein.

BRIEF DESCRIPTION OF THE DRAWINGS

Several embodiments will be described in detail with reference to the drawings, in which.

Figure 1:
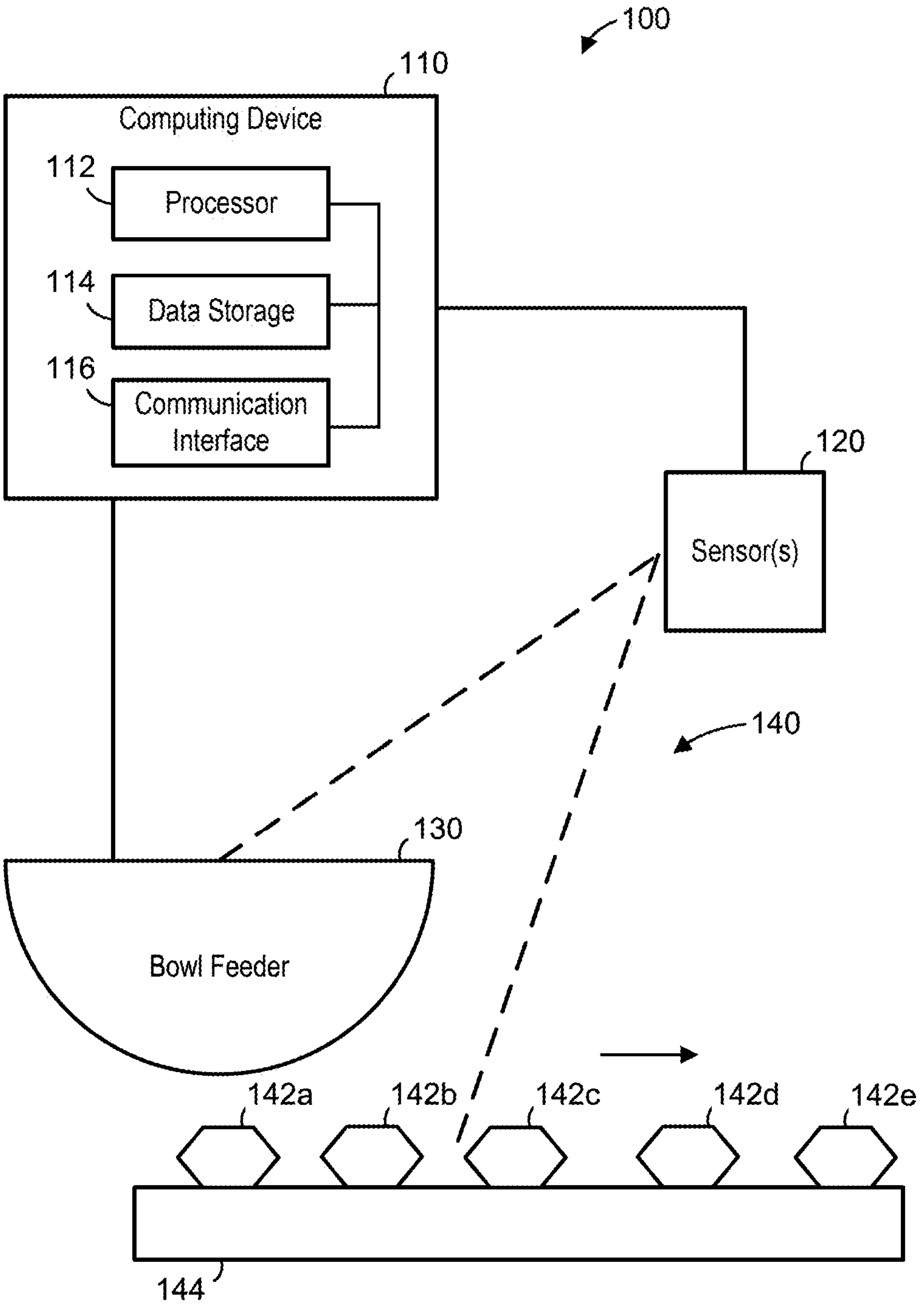
FIG. 1 is a block diagram of an example system for a manufacturing line, in accordance with at least one embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Referring now to FIG. 1, there is shown an example system 100 for a manufacturing line 140. As shown, the system 100 can include at least one sensor 120 and a computing device 110.

The manufacturing line 140 can be any type of production or manufacturing line for manufacturing, producing, or processing workpieces 142. For example, the manufacturing line 140 can be configured to produce engine parts, medical devices, electronics, or any other articles. Generally, the manufacturing line 140 can include one or more subsections or stations (not shown) that are spaced along the manufacturing line 140 and configured to perform specific processing tasks on the workpieces 142*a*, 142*b*, 142*c*, 142*d*, 142*e* (collectively referred to as workpieces 142). Although five workpieces are shown in FIG. 1, the manufacturing line 140 can include any number of workpieces 142.

During operation, the workpieces 142 can be transported along the manufacturing line 140 and successively processed by various stations until a finished article is produced. As shown, the manufacturing line 140 may include one or more transport mechanisms 144 operable to transport the workpieces 142 along the manufacturing line 140, such as a linear or inline feeder, or conveyor. The particular arrangement and configuration of the manufacturing line 140 can depend on the type of the workpiece 142 being manufactured, produced, or processed. In some embodiments, the transport mechanism 144 can transport similar workpieces 142 along the manufacturing line 140 synchronously. Workpieces 142 that are dissimilar may indicate that a production station did not process a workpiece properly, such as a missing part.

Workpieces 142 that are not moving synchronously may indicate an abnormality with the transport mechanism 144 that may require repair. As well, the transport mechanism 144 can stop at production stations to allow the workpieces 142 to be processed at the production stations. In some embodiments, the change in the synchronous speed of workpieces may be a result of a deviation in the duration of a stop at the production station.

The subsections or stations can include a bowl feeder 130 that is configured to feed workpieces 142 to the manufacturing line 140. The bowl feeder 130 can output the workpieces 142 such that the workpieces 142 are spaced apart from one another (i.e., one-by-one). The spacing between workpieces 142 can allow the workpieces 142 to be individually processed by a subsequent production station in the manufacturing line 140. In some embodiments, the bowl feeder 130 can output the workpieces 142 to have a particular orientation on the manufacturing line 140. The particular orientation of the workpieces 142 can allow the workpieces 142 to be processed by a subsequent production station in the manufacturing line 140.

The bowl feeder 130 can include a plurality of shelves at varying heights within the bowl feeder and an exit at a lower portion of the bowl feeder 130. The bowl feeder 130 can gently shake, which causes parts to fall to lower portions of the bowl feeder 130 and eventually exit individually. Under normal operation, parts can populate all shelves, including the lower shelves, and be aligned towards the outer portion of the bowl and exit. However, an accumulation of parts within a particular portion of the bowl feeder 130 can result in a jam. Fewer parts in the lower shelves can also indicate that parts are accumulating in some portion of the bowl feeder 130. As well, parts that are misaligned or sideways, that is, not aligned towards the outer portion of the bowl and exit, can indicate that parts are accumulating in some portion of the bowl feeder 130.

The bowl feeder 130 can be positioned anywhere in the manufacturing line 140. In the illustrated example, the bowl feeder 130 is positioned at the start of the manufacturing line 140 and is configured to feed workpieces to the manufacturing line 140. However, in other embodiments, the bowl feeder 130 may be positioned at an intermediate stage of the manufacturing line 140. In some embodiments, the manufacturing line 140 may include more than one bowl feeder 130 to feed workpieces at various stages of the manufacturing process.

Although only a single sensor 120 is shown in the illustrated example, it will be appreciated that there can be any number of sensors 120. Furthermore, it will be appreciated that the sensors 120 can be positioned at various locations. As shown, the sensors 120 may disposed proximal to the bowl feeder 130. For example, the sensors 120 may include one or more contactless sensors. The sensors 120 may be disposed on the bowl feeder 130. The sensors 120 may be proximal to the manufacturing line 140.

The at least one sensor 120 can include at least one image device capable of capturing images. For example, the image device can be a camera. The image device can capture a sequence of images of at least a portion of the bowl feeder 130. The sequence of images can include video data, such as a live stream of the bowl feeder 130. The image device can transmit the images to the computing device 110.

The at least one sensor 120 can include additional sensors to measure current conditions at the bowl feeder 130. For example, one or more additional sensors can measure one or more environmental conditions at the bowl feeder 130. Various types of additional sensors can be used to measure various types of environmental conditions. For example, the environmental conditions may include temperature, humidity, vibration, and the like. As shown, the environmental conditions can be measured by measuring various characteristics of the bowl feeder 130 and/or the surroundings thereof. The additional sensors 120 can transmit the measured environmental conditions to the computing device 110.

In some embodiments, the one or more additional sensors may include one or more temperature sensors. The one or more temperature sensors can measure the temperature of the bowl feeder 130. Additionally or alternatively, the one or more temperature sensors can measure the ambient temperature of the air adjacent the bowl feeder 130. Various types of temperature sensors may be used. For example, the temperature sensors may be provided by thermistors, thermocouples, resistance thermometers, and the like.

In some embodiments, the one or more additional sensors may include one or more humidity sensors. The humidity sensors can measure a humidity within the bowl feeder 130. Additionally, or alternatively, the humidity sensors may measure the ambient atmospheric humidity of the manufacturing facility. Various types of humidity sensors may be used. For example, the humidity sensors may be capacitive sensors, resistive sensors, or thermal humidity sensors, and the like.

In some embodiments, the one or more additional sensors may include one or more vibration sensors. The vibration sensors can measure a vibration of the bowl feeder 130. Various types of vibration sensors may be used. For example, the vibration sensors may be capacitive sensors, electromagnetic sensors, piezoelectric sensors, optical sensors, and the like.

In some embodiments, the one or more additional sensors may include one or more part feed sensors. The part feed sensors can count workpieces 142 output by the bowl feeder 130 to the manufacturing line 140. Various types of part feed sensors may be used. For example, part feed sensor may be proximity sensors, accelerometers, capacitive sensors, resistive sensors, electromagnetic sensors, piezoelectric sensors, optical sensors, and the like.

In some embodiments, the one or more additional sensors may include one or more part position sensors. The part position sensors can generate position data about the workpieces 142 within the bowl feeder 130. Various types of part position sensors may be used. For example, part position sensor may be proximity sensors, accelerometers, capacitive sensors, resistive sensors, electromagnetic sensors, piezoelectric sensors, optical sensors, and the like.

In some embodiments, the one or more additional sensors may include another image device. The other image device can generate image data of the workpieces in the bowl feeder 130. For example the other image device can be a scanner, such as a three-dimensional scanner. The other image device can transmit the image data to the computing device 110. The computing device 110 can determine dimensions of the workpieces within bowl feeder based on the image data. In some embodiments the computing device 110 can also determine dimensions of the workpieces based on a tracking data associated with the workpieces.

The computing device 110 can communicate with the bowl feeder 130, transport mechanism 144, and the at least one sensor 120. For example, the computing device 110 can receive data from the at least one sensor 120 and transmit data to the bowl feeder 130 and the transport mechanism 144. For example, the computing device 110 can receive images from an image device. The computing device 110 can also receive current condition data from one or more additional sensors. The computing device 110 can transmit control settings to the bowl feeder 130 and/or transport mechanism 144. The computing device 110 can also determine parameter settings from the bowl feeder 130 and/or the transport mechanism 144. The computing device 110 can use various artificial intelligence or machine learning methods to predict anomalies along the manufacturing line 140, including the bowl feeder 130 and/or the transport mechanism 144, as will be described with reference to FIG. 3.

In some embodiments, there may be a plurality of bowl feeders 130, a plurality of transport mechanisms 144, and a plurality of sensors 120, and the computing device 110 can communicate with each of the bowl feeders 130, transport mechanisms 144, and sensors 120 over a network. In this manner, the computing device 110 can perform the various monitoring methods described herein on the plurality of bowl feeders 130 and/or transport mechanisms 144 remotely.

The network may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX, Ultra-wideband, Bluetooth®), SS7 signaling network, fixed line, local area network, wide area network, and others, including any combination of these, capable of interfacing with, and enabling communication between, the various components of the system 100.

The computing device 110 can generally be implemented using hardware or a combination of hardware and software. For example, the computing device 110 may be implemented using an electronic tablet device, a personal computer, workstation, server, portable computer, mobile device, personal digital assistant, laptop, smart phone, WAP phone, PLC (programmable logic controller), industrial controller, microcontroller, or any combination of these.

In some embodiments, the computing device 110 may be provided by two or more computers distributed over a wide geographic area and connected through a network. As shown, the computing device 110 can include a processor 112, a data storage 114, and a communication interface 116. Each of these components may be divided into additional components or combined into fewer components. In some cases, one or more of the components may be distributed over a wide geographic area. It will be understood that some of the computing device 110 can be implemented in a cloud computing environment.

The computing device 120 can include any networked device operable to connect to the network. A networked device is a device capable of communicating with other devices through the network. A networked device may couple to the network through a wired or wireless connection. Although only one computing device 110 is shown in FIG. 1, it will be understood that more computing devices 110 can connect to the network.

The processor 112 can operate to control the operation of the computing device 110. The processor 112 can initiate and manage the operations of each of the other components within the computing device 110. The processor 112 may be implemented with any suitable processors, controllers, digital signal processors, graphics processing units, application specific integrated circuits (ASICs), and/or field programmable gate arrays (FPGAs) that can provide sufficient processing power depending on the configuration, purposes and requirements of the system 100. In some embodiments, the processor 112 can include more than one processor with each processor being configured to perform different dedicated tasks. The processor 112 can execute various instructions stored in the data storage 114 to implement the various control methods described herein.

The data storage 114 can include RAM, ROM, one or more hard drives, one or more solid state drives (SSD), one or more flash drives or some other suitable data storage elements such as disk drives. The data storage 114 can store various data collected from the sensors 120, the transport mechanism 144, and/or the bowl feeder 130. The data storage 114 can also store instructions that can be executed by the processor 112 to implement the various control methods described herein. In some embodiments, the data storage 114 may be more than one data storage component. For example, the data storage 114 may include a local data storage located at the computing device 110 and an external data storage that is remote from the local data storage and connected to the computing device 110 over a network.

The communication interface 116 can include any interface that enables the computing device 110 to communicate with various devices and other systems. The communication interface 116 can include at least one of a serial port, a parallel port or a USB port, in some embodiments. The communication interface 116 may also include an interface to a component via one or more of a Bluetooth, WIFI, Internet, Local Area Network (LAN), Ethernet, Firewire, modem, fiber, industrial network, Profibus®, ProfiNet®, OPC, DeviceNet®, EtherCAT®, Modbus®, or digital subscriber line connection. Various combinations of these elements may be incorporated within the communication interface 116. The communication interface 116 can be used to communicate with the bowl feeder 130 and/or the sensors 120, for example, to receive image data, current condition data, and parameter settings, and to transmit control settings.

For example, the communication interface 116 may receive input from various input devices, such as a mouse, a keyboard, a touch screen, a thumbwheel, a track-pad, a track-ball, a card-reader, voice recognition software and the like depending on the requirements and implementation of the computing device 110.

Figure 2:
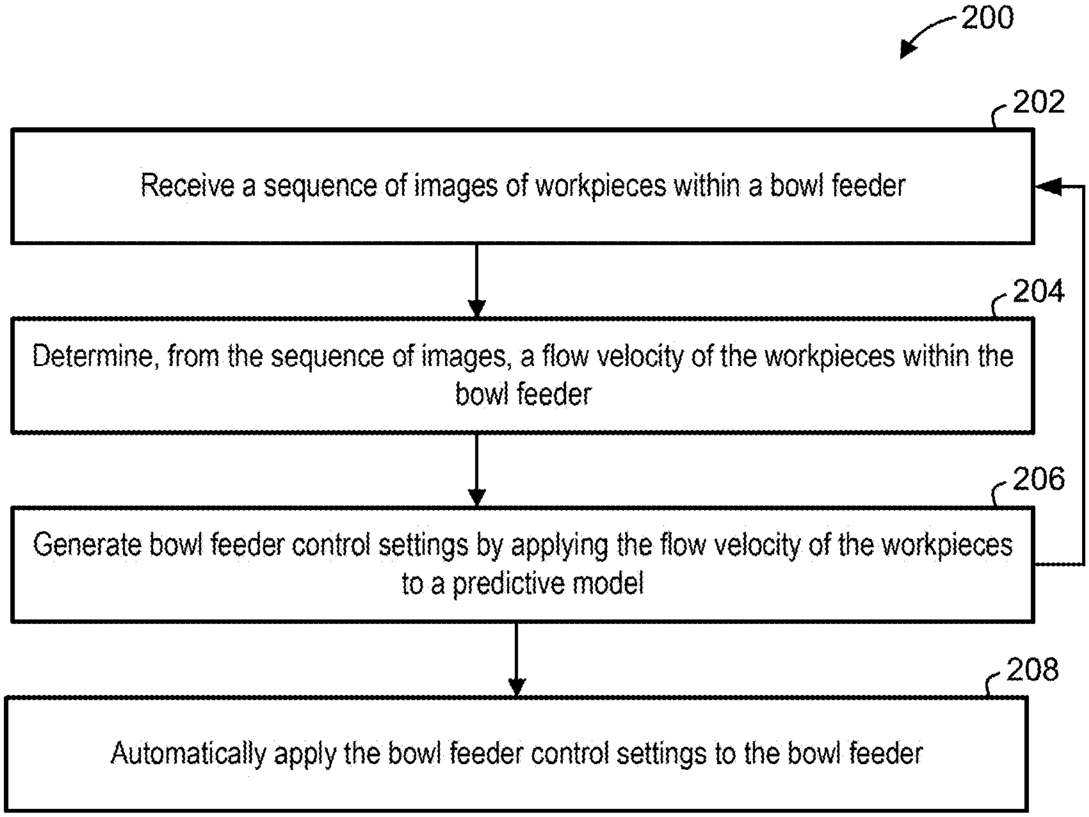
FIG. 2 is a block diagram of an example method for feeding workpieces to a manufacturing line via a bowl feeder, in accordance with at least one embodiment.

Referring now to FIG. 2, an example method 200 of feeding workpieces to a manufacturing line via a bowl feeder is shown in a flowchart diagram. To assist with the description of the method 200, reference will be made simultaneously to FIG. 1. A computing device, such as computing device 110 having a processor 112, can be configured to implement method 200.

Method 200 can begin at 202. The processor 112 can receive a sequence of images of workpieces within the bowl feeder. The processor 112 can receive the sequence of images from at least one image device proximal to the bowl feeder. The image device can be a sensor 120 of FIG. 1.

At 204, the processor 112 can determine, from the sequence of images, a flow velocity of the workpieces within the bowl feeder.

At 206, the processor 112 can generate bowl feeder control settings by applying the flow velocity of the workpieces to a predictive model. The predictive model can be trained based on performance statistics of analogous bowl feeders and/or analogous workpieces.

At 208, the processor 112 can automatically apply the bowl feeder control settings to the bowl feeder. The bowl feeder control settings can include at least one of a motor control setting, a blow-off control setting, or a hopper control setting. For example, the motor control setting can relate to the power (i.e., on or off) of a motor for the bowl feeder and/or frequency of the motor. The hopper control setting can relate to starting or stopping a hopper for the bowl feeder.

In some embodiments, prior to generating bowl feeder control settings, the at least one processor can determine bowl feeder parameter settings. Bowl feeder parameter settings can include a bowl fill level and an operating mode. In some embodiments, the operating mode can be a burst mode, a hold mode, and/or an automatic mode. In some embodiments, the bowl feeder parameter settings can also include a start control, a stop control, and/or an override control.

The processor 112 can applying the bowl feeder parameter settings, along with the flow velocity, to the predictive model to generate the bowl feeder control settings.

In some embodiments, the processor 112 can generate a replenishment notification based on the count of parts output by the bowl feeder.

In some embodiments, the processor 112 can generate a fault notification based on the part positions detected within the bowl feeder.

In some embodiments, prior to generating bowl feeder control settings, the processor 112 can determine at least one performance metric for the bowl feeder. Performance metrics can include a current operation rate or a current operation performance. The processor 112 can apply the performance metric, along with the flow velocity, to the predictive model to generate the bowl feeder control settings.

Figure 3:
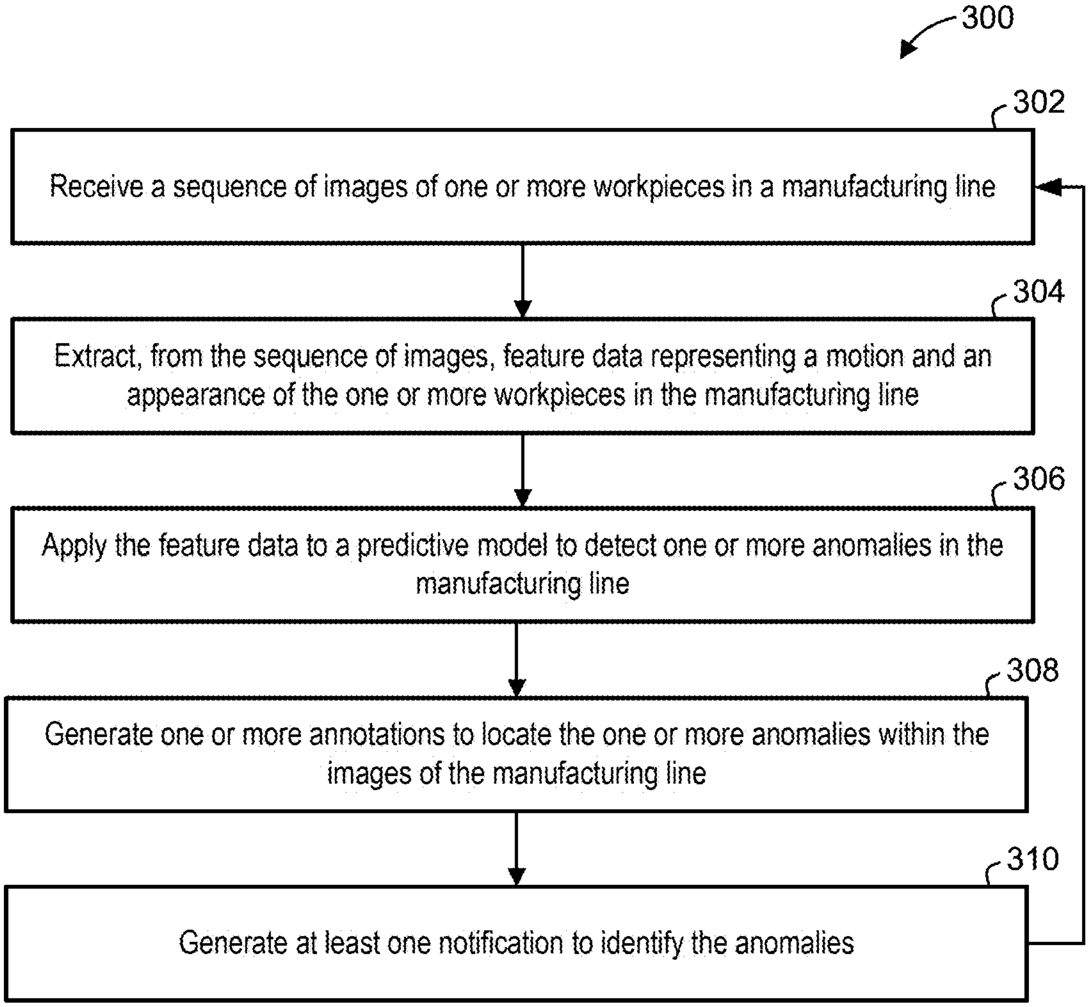
FIG. 3 is a flowchart of an example method for predicting anomalies in a manufacturing line, in accordance with at least one embodiment.

Referring now to FIG. 3, an example method 300 of predicting anomalies in a manufacturing line is shown in a flowchart diagram. To assist with the description of the method 300, reference will be made simultaneously to FIG. 1. A computing device, such as computing device 110 having a processor 112, can be configured to implement method 300.

Method 300 can begin at 302. The processor 112 can receive a sequence of images of one or more workpieces in the manufacturing line. The processor 112 can receive the sequence of images from at least one image device proximal to the manufacturing line. The image device can be a sensor 120 of FIG. 1. In some embodiments, the manufacturing line can include one or more transport mechanisms and/or bowl feeders.

In some embodiments, the processor 112 can pre-process the sequence of images. In at least one embodiment, pre-processing the sequence of images can involve aligning each image of the sequence of images. Aligning each image of the sequence of images can involve applying an offset to one or more images of the sequence. Aligning image may be necessary due to movement of the image device.

In at least one embodiment, pre-processing the sequence of images can involve detecting one or more moving workpieces in the sequence of images; segmenting each moving workpiece of the one or more moving workpieces in a first image of the sequence of images; selecting at least one moving workpiece of the one or more moving workpieces; and identifying a region of interest for each selected moving workpiece in each image of the sequence of images.

In at least one embodiment, pre-processing the sequence of images can involve adjustment to account for differences in lighting between images.

At 304, the processor 112 can extract feature data from the sequence of images. The feature data can include a representation of a motion and an appearance of the workpieces in the manufacturing line. In some embodiments, the processor 112 can concatenate feature data representative of a motion of the workpieces with feature data representative of an appearance of the workpieces. The motion of a workpiece can include but is not limited to its speed, velocity, acceleration, and/or trajectory. The appearance of a workpiece can include but is not limited to its shape, size, color, markings, orientation, and/or position.

In some embodiments, the processor 112 can identify a plurality of images amongst the sequence of images showing a same moving workpiece of the one or more moving workpieces. That is, the processor 112 can identify a subset of the sequence of images in which the moving workpiece is shown. The plurality of images showing a moving workpiece can be different from another plurality of images showing another moving workpiece.

Having identified the plurality of images showing a moving workpiece, the processor 112 can select feature data associated with the moving workpiece, which can include a position and a timing associated with the position of the moving workpiece in each image of the plurality of images.

The processor 112 can apply the feature data associated with the moving workpiece to a regression model to determine the velocity of the moving workpiece.

In some embodiments, the processor 112 can adjust for the frame rate of the image device. In some embodiments, a high speed camera can be used, which can have a constant frame rate to allow for simpler processing. In some embodiments, additional processing can adjust for an inconsistent frame rate.

In some embodiments, the processor 112 can reconstruct the motion of a moving workpiece across a plurality of images. In at least one embodiment, for each moving workpiece of the sequence of images, the processor can reconstruct the motion of that workpiece. In some embodiments, the processor 112 can detect and mask the moving workpiece within each image of the associated plurality of images. The moving workpiece can be detected based on its appearance such as its shape, size, color, and/or markings.

In some embodiments, the processor 112 can apply the reconstructed motion of the workpiece, such as feature data associated with the moving workpiece in each image of the associated plurality of images, to a predictive model to classify the reconstructed motion as a type of motion. The predictive model can be trained based on spatio-temporal patterns and process flows to classify common motion types. In some embodiments, when the predictive model cannot classify the motion as a common motion type, the predictive model can identify that motion as an anomaly.

At 306, the processor 112 can apply the feature data extracted from the sequence of images to a predictive model to detect one or more anomalies in the manufacturing line. In some embodiments, the processor 112 can, for each anomaly of the one or more anomalies, identify at least one image amongst the sequence of images showing the anomaly. The processor 112 can select feature data associated with the anomaly and apply the feature data associated with the anomaly to the predictive model to determine classification to be associated with the anomaly.

In some embodiments, when the manufacturing line includes a transport mechanism, the predictive model can detect, from the feature data representative of the appearance of the workpieces, a missing part of a workpiece on the transport mechanism and/or incoming new objects. The predictive model can classify the missing part as an anomaly.

In some embodiments, when the manufacturing line includes a transport mechanism, the predictive model can detect, from the feature data representative of the motion of the workpieces, a change in a synchronous speed of a workpiece along the transport mechanism and/or a change in deviations in brief stop positions. The predictive model can classify the change in a synchronous speed of a workpiece as an anomaly.

In some embodiments, when the manufacturing line includes a transport mechanism, the predictive model can detect external disturbances and predict whether the disturbances are abnormal. The predictive model can detect the flow of the production line and predict whether the flow is stable.

In some embodiments, when the manufacturing line includes a bowl feeder, the predictive model can detect an accumulation of workpieces within the bowl feeder, a misalignment of workpieces within the bowl feeder, and/or insufficient workpieces within a lower portion of the bowl feeder.

In some embodiments, the processor 112 can determine one or more corrective actions for the one or more anomalies, based on the classifications associated with the one or more anomalies. The processor 112 can define a set of operating commands for one or more actuators of the manufacturing line based on the one or more corrective actions and operate the one or more actuators to implement the one or more corrective actions. The one or more actuators can include but is not limited to pneumatic air blasts, vacuums, mechanical levers, wipers, paddles, or other kinematic mechanisms.

For example, in the case of an accumulation of workpieces within the bowl feeder, one or more actuators of the manufacturing line can be operated to adjust the workpieces in and around the area having the accumulation of parts. In the case of a missing workpiece along a transport mechanism, one or more actuators can be operated to remove the workpiece from the transport mechanism. For example, air blasts can be used to remove the workpiece from the transport mechanism.

At 308, the processor 112 can generate one or more annotations to locate the one or more anomalies within the images of the manufacturing line. In some embodiments, generating an annotation can involve generating a bounding box representing the location of the anomaly within an image of the manufacturing line. In some embodiments, generating an annotation can involve highlight, or shading the location of the anomaly within an image of the manufacturing line.

At 310 the processor 112 can generate at least one notification to identify the anomalies. The at least one notification can include the one or more annotations. In some embodiments, the at least one notification can include an indication of the classification associated with the anomaly. In some embodiments, the at least one can include an indication of the one or more corrective actions. In some embodiments, the at least one notification can be made available to an operator of the manufacturing line. In some embodiments, generating a notification can involve generating an alarm (e.g., visual or audio) at the computing device 110, or the manufacturing line itself, such as the bowl feeder 130 or transport mechanism 144.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms “coupled” or “coupling” as used herein can have several different meanings depending in the context in which these terms are used. For example, the terms coupled or coupling may be used to indicate that an element or device can electrically, optically, or wirelessly send data to another element or device as well as receive data from another element or device. Furthermore, the term “coupled” may indicate that two elements can be directly coupled to one another or coupled to one another through one or more intermediate elements.

It should be noted that terms of degree such as “substantially”, “about” and “approximately” as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by end-points herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A method for feeding workpieces to a manufacturing line via a bowl feeder, the method comprising operating at least one processor to:

receive, from at least one image device proximal to the bowl feeder, a sequence of images of workpieces within the bowl feeder;

determine, from the sequence of images, a flow velocity of the workpieces within the bowl feeder;

generate bowl feeder control settings by applying the flow velocity of the workpieces to a predictive model; and automatically apply the bowl feeder control settings to the bowl feeder.

2. The method of claim 1, further comprising operating the at least one processor to determine at least one performance metric for the bowl feeder, wherein operating the at least one processor to generate bowl feeder control settings further comprises applying the at least one performance metric to the predictive model.

3. The method of claim 2, wherein the at least one performance metric comprises at least one of a current operation rate or a current operation performance.

4. The method of claim 1, further comprising operating the at least one processor to determine bowl feeder parameter settings, wherein operating the at least one processor to generate bowl feeder control settings further comprises applying the bowl feeder parameter settings to the predictive model.

5. The method of claim 4, wherein the bowl feeder parameter settings comprise a bowl fill level and an operating mode.

6. The method of claim 5, wherein the operating mode can be at least one selected from a group consisting of a burst mode, a hold mode, and an automatic mode.

7. The method of claim 1, further comprising operating the at least one processor to receive, from at least one sensor disposed at the bowl feeder, current condition data indicating at least one current condition of the bowl feeder, wherein operating the at least one processor to generate bowl feeder control settings further comprises applying the current condition data to the predictive model.

8. The method of claim 7, wherein:

the at least one sensor comprises another image device to generate image data of workpieces within the bowl feeder; and the method comprises operating the at least one processor to determine dimensions of the workpieces within the bowl feeder based on the image data.

9. The method of claim 7, wherein the at least one sensor comprises a part feed sensor to generate part feed data indicative of a count of workpieces output by the bowl feeder.

10. The method of claim 9, further comprising operating the at least one processor to generate a replenishment notification based on the count of workpieces output by the bowl feeder.

11. The method of claim 7, wherein the at least one sensor comprises a part position sensor to generate part position data indicative of part positions within the bowl feeder.

12. The method of claim 11, further comprising operating the at least one processor to generate a fault notification based on the part positions detected within the bowl feeder.

13. A system for feeding workpieces to a manufacturing line via a bowl feeder, the system comprising:

at least one processor operable to:

receive, from at least one image device proximal to the bowl feeder, a sequence of images of workpieces within the bowl feeder;

determine, from the sequence of images, a flow velocity of the workpieces within the bowl feeder;

generate bowl feeder control settings by applying the flow velocity of the workpieces to a predictive model; and automatically apply the bowl feeder control settings to the bowl feeder.

14. The system of claim 13, wherein the at least one processor is further operable to determine bowl feeder parameter settings; and apply the bowl feeder parameter settings to the predictive model.

15. The system of claim 13, wherein the at least one processor is further operable to determine at least one performance metric for the bowl feeder and apply the at least one performance metric to the predictive model.

16. The system of claim 13, wherein the bowl feeder control settings comprise at least one of a motor control setting, a blow-off control setting, or a hopper control setting.

17. The system of claim 13, wherein the at least one processor is located remotely from the bowl feeder.

18. The system of claim 13, wherein the at least one processor is further operable to receive, from at least one sensor disposed at the bowl feeder, current condition data indicating at least one current condition of the bowl feeder; and apply the current condition data to the predictive model.

19. The system of claim 18, wherein the at least one sensor comprises a humidity sensor to generate humidity data indicative of a humidity level at the bowl feeder.

20. The system of claim 18, wherein the at least one sensor comprises a temperature sensor to generate temperature data indicative of a temperature at the bowl feeder.

21. The system of claim 18, wherein the at least one sensor comprises a vibration sensor to generate vibration data indicative of a vibration of the bowl feeder.

22. The system of claim 18, wherein:

the at least one sensor comprises another image device to generate image data of workpieces within the bowl feeder; and the at least one processor is operable to determine dimensions of the workpieces within the bowl feeder based on the image data.

23. The system of claim 18, wherein the at least one sensor comprises a part feed sensor to generate part feed data indicative of a count of workpieces output by the bowl feeder.

24. The system of claim 23, wherein the at least one processor is further operable to generate a replenishment notification based on the count of workpieces output by the bowl feeder.

25. The system of claim 18, wherein the at least one sensor comprises a part position sensor to generate part position data indicative of part positions within the bowl feeder.

26. The system of claim 25, wherein the at least one processor is further operable to generate a fault notification based on the part positions detected within the bowl feeder.

* * * * *